Nov. 17, 1959   J. J. KERLEY, JR., ET AL   2,913,215
SHOCK AND VIBRATION ISOLATOR
Filed Feb. 10, 1956                           3 Sheets-Sheet 2

Nov. 17, 1959 J. J. KERLEY, JR., ET AL 2,913,215
SHOCK AND VIBRATION ISOLATOR
Filed Feb. 10, 1956 3 Sheets-Sheet 3

WITNESSES

INVENTORS
James J. Kerley, Jr.
& Robert M. Sando
BY
ATTORNEY

United States Patent Office 2,913,215
Patented Nov. 17, 1959

2,913,215

SHOCK AND VIBRATION ISOLATOR

James J. Kerley, Jr., Cheverly, and Robert M. Sando, Baltimore, Md., assignors to Westinghouse Electric Corporation, East Pittsburgh, Pa., a corporation of Pennsylvania Application February 10, 1956, Serial No. 564,733

7 Claims. (Cl. 248—358)

This invention relates to an article of manufacture adapted for use in damping transmission of vibration and shock between two bodies. It is particularly adaptable in cases where vibration and shocks of high energy content must be isloated in all three planes.

Previous to this invention, shock and vibration isolators had been proposed which were capable of fairly good isolation properties in two planes. Most of these isolators, however, were not adaptable to wide variations in vibration frequency; and, thus, the load on the isolator had to be stipulated carefully within predetermined limits as a small variation in the load would cause a material change in the natural frequency of the mount. Another drawback of conventional isolators was that they were subject to "bottoming" (i.e. full compression of a spring or other shock absorbing means) under shock or vibration loads of high energy content.

It is an object of this invention to provide a new and improved shock and vibration isolating mount.

More specifically, it is an object of the invention to provide a mount capable of damping transmission of vibration and shocks of high energy content in all three planes.

In the embodiments of the invention shown and described herein, a sheet of substantially flexible metal or the like has two of its opposite ends connected, respectively, to the bodies which are to be isolated. The metal sheet is bent or curved between its opposite ends to produce an accordion effect whereby the two bodies may have relative motion in three planes. On at least one face of the metal sheet is secured rubber or other similar elastic material. With this configuration, exceptionally good shock and vibration isolation is achieved without any critical frequency range except in edge-wise high frequency vibration.

The invention is particularly adapted for mounting electronic equipment on missiles, airplanes, ships and the like. It may, however, be used in any installation where one body must be isolated from another with respect to vibration and shock.

Further objects and features of the invention will become apparent from the following detailed description taken in connection with the accompanying drawings which form a part of this specification and in which.

Figure 1:
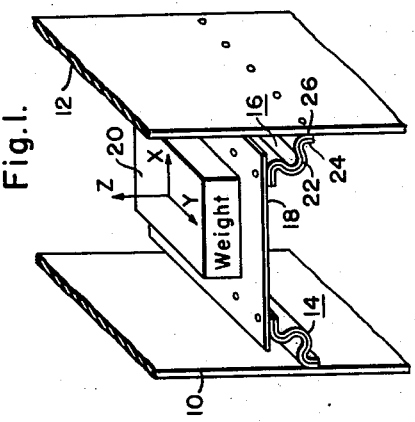
Figure 1 is a three dimensional view illustrating an assembly incorporating one embodiment of the isolating mount of the invention.

Referring to Fig. 1, there is shown a portion of a chassis comprising two vertical supporting walls 10 and 12. The chassis may be mounted on an aircraft, ship or other moving instrumentality which is subject to vibration and shock. A shock and vibration isolator 14 or 16 is secured to each of the walls 10 and 12 by rivets, bolts or other suitable fastening means, not shown. Mounted on top of the isolator 14 or 16 by suitable fastening means, not shown, is a mounting platform 18 adapted to support electronic or other equipment, represented by the weight 20.

Figure 2A:
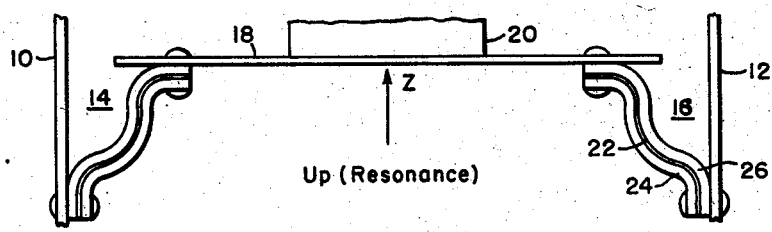
Figs. 2A and 2B are cross-sectional views of the mount showing its shape when loaded along the Z axis.

In the embodiment of the invention shown in Figure 2A, the isolator itself comprises a sheet of elongated flexible metal 22 sandwiched between two sheets of elastic material 24 and 26 such as rubber or plastic. The elastic material is securely fastened over the entire surfaces of the metal sheet by cement or any other suitable bonding material. The metal sheet is corrugated along its long transverse dimension substantially as shown. Although the metal need not necessarily be bent to have the cross-sectional design shown, it is necessary that it be curved in some manner so that it will be allowed to bend under loads, as it is the bending motion which generates heat and damps out vibration.

Figure 2B:
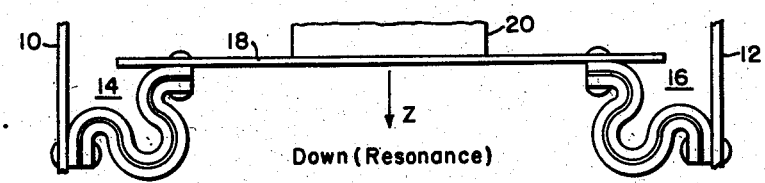

Referring to Fig. 2A, it can be seen that when there is an inertia force in the upward direction along the Z axis, the mount elongates. Most of the energy is absorbed by bending of the rubber and metal, there being very little tension produced. When the inertia force is downward along the Z axis as shown in Fig. 2B, the mount is compressed, but again the compression is taken by bending of the mount and very little, if any, compression is exerted along the central axis of the mount.

Figure 2C:
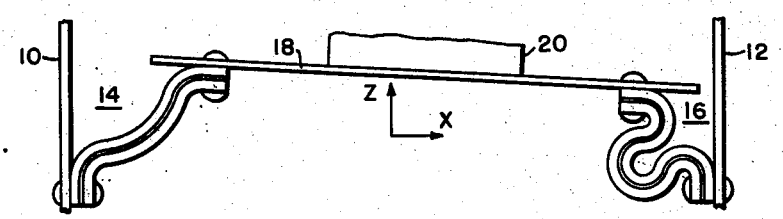
Figs. 2C and 2D are cross-sectional views of the mount showing its shape when loaded along the X axis.
Figure 2D:
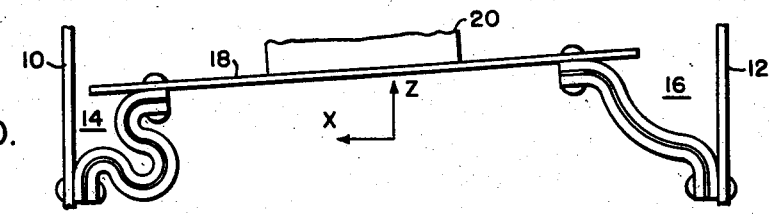
Figure 2G:
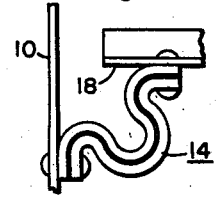
Figs. 2G, 2H, 2J and 2K are cross-sectional views taken along the lines G—G, H—H, J—J and K—K, respectively, in Figs. 2E and 2F.
Figure 2E:
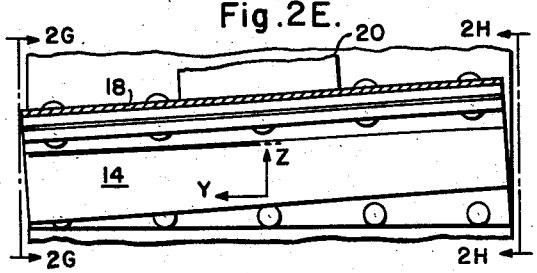
Figs. 2E and 2F are views showing the shape of the side of the mount when loaded along the Y axis.
Figure 2H:
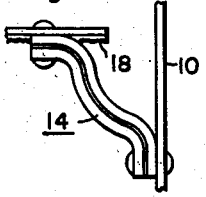
Figure 2J:
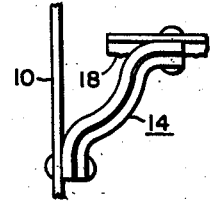
Figure 2F:
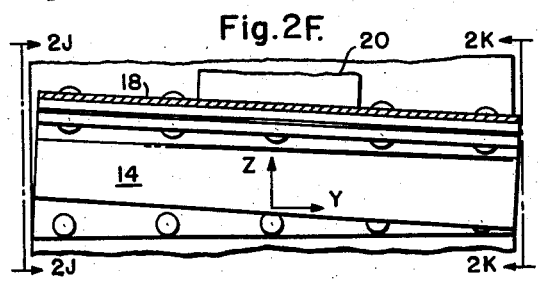
Figure 2K:
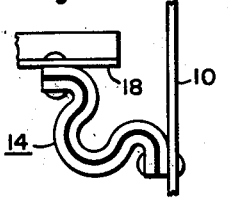

The motion of the mount when the inertia is along the X axis is shown in Figs. 2C and 2D. One of the mounts elongates and the other compresses while the vibration or shock is damped by a bending action in the metal and rubber.

When the inertia is right or left along the Y axis, one end of the mount will compress while the other elongates, as shown in Figs. 2E to 2K. This type of motion in the mount provides for vibration and shock isolation in the third plane.

Figure 3:
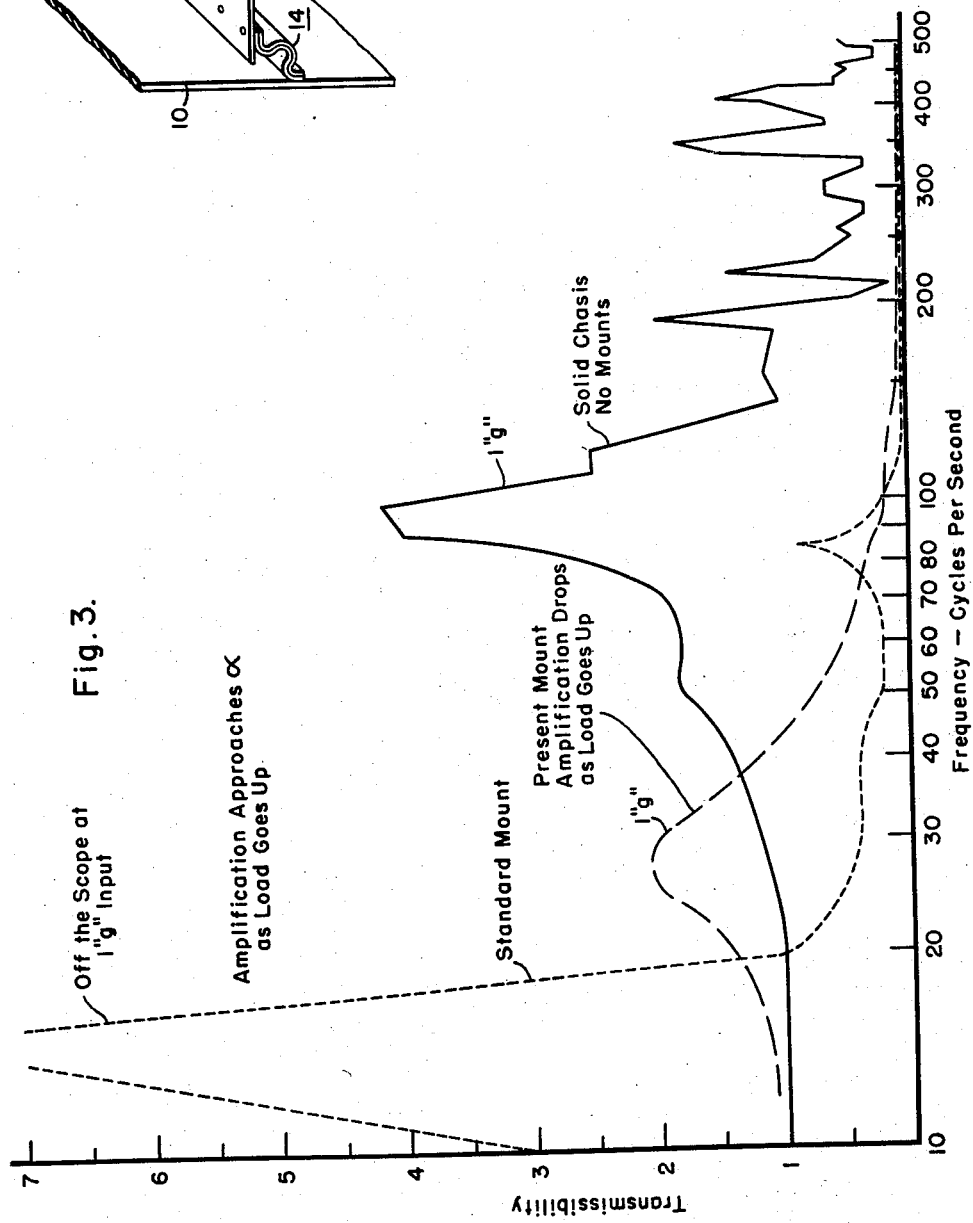
Fig. 3 is a graph illustrating the performance characteristics of the mount shown in Figs. 1 and 2 as compared with the characteristics of a prior art mount and with the case where no mount is used.

The characteristics of the mount shown in Figs. 1 and 2 can best be understood by reference to Fig. 3 where transmissibility versus frequency in cycles per second is plotted. In accordance with well-known vibration theory, transmissibility is defined as the ratio of the output in G's to the input in G's. In all cases the load was accelerated by an amount equal to 1 g. (i.e. one times the acceleration due to gravity). It can be seen that in the case of a conventional mount which is subject to "bottoming," the transmissibility increases and approaches infinity at a particular frequency (in this case approximately 10 cycles per second). When no mount is used, the transmissibility is low at low frequencies and approaches a maximum at approximately 100 cycles per second. Above this point, the transmissibility varies over a wide range. With the isolation mount of the present invention, transmissibility reaches its peak at approximately 30 cycles, but this peak is much lower than that of the conventional mount and the case where no mount is used. At higher frequencies the transmissibility approaches zero except in the edge-wise plane at higher frequencies. It is evident from the graph that the present mount does not have any critical frequency range except in the edge-wise plane at higher frequencies. As the natural frequency of the isolator of the invention (30 cycles per second) the magnification of vibration builds up to a point where bending is so completely non-linear that further amplitude of excitation does nothing more than work the rubber back and forth in internal shear flow.

At the resonant frequency at the upper end of the frequency excursion shown in the graph, the mount is in tension and non-linear bending. At the lower end of the frequency excursion the mount is in non-linear bending alone. When the isolator goes from bending to tension, the natural frequency changes. Thus, at low input frequencies where only bending exists, magnifications of four to six are present, but at high inputs the non-linearity of the bending causes a change in phase angle, and frequency magnification drops down to less than two or three. It is obvious from the graph of Fig. 3 that whereas a conventional mount has a critical frequency range, the present mount has no critical frequency range except in the edge-wise plane at higher frequencies and has isolation properties which are relatively constant over the entire frequency range.

Figure 4A:
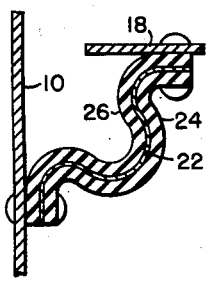
Figs. 4A to 4D illustrate various modifications of the mount shown in Fig. 1.
Figure 4B:
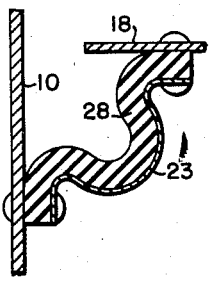
Figure 4C:
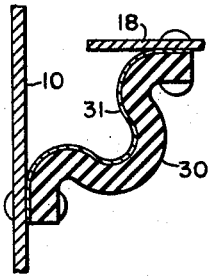
Figure 4D:
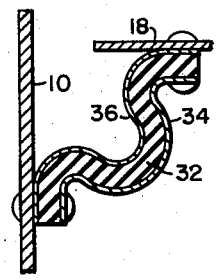
Figure 5A:
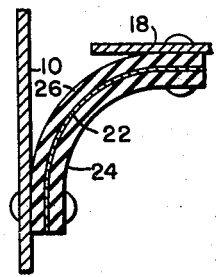
Figs. 5A to 5D illustrate various modifications of another embodiment of the invention; and, Figs. 6A to 6D illustrate various modifications of still another embodiment of the invention.
Figure 5B:
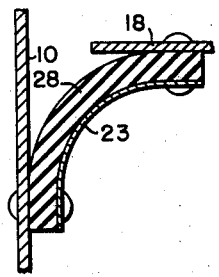
Figure 5C:
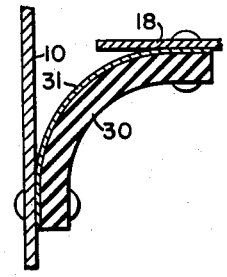
Figure 5D:
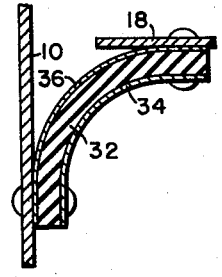
Figure 6A:
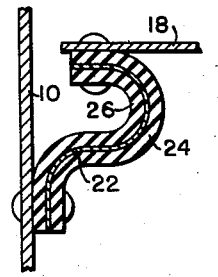
Figure 6B:
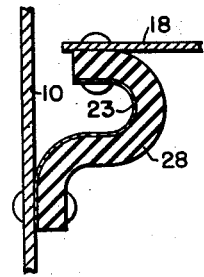
Figure 6C:
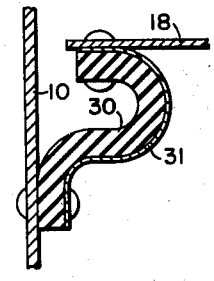
Figure 6D:
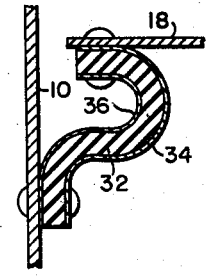

In Fig. 4A the cross-section of the embodiment of the invention shown in Fig. 1 is duplicated. In Fig. 4B a modification of the invention is shown wherein rubber 28 is secured to the upper face of the sheet 23 only. In Fig. 4C the configuration is reversed and the rubber 30 is secured to the lower surface of sheet 31 only. In Fig. 4D a sheet of rubber or other elastic material 32 is sandwiched between two metal sheets 34 and 36. Figs. 5A to 5D illustrate modifications of the invention wherein the rubber and metal are bent to assume the shape of a quadrant of a circle. The variations in the arrangement of the metal and rubber are readily apparent from the drawing. Figs. 6A to 6D illustrate still another form of the invention wherein the modifications and the method of fabricating the mount are also apparent.

The configurations shown in Figs. 4A and 4B, 5A and 5B, and 6A and 6B are primarily intended for supporting light loads; whereas the configurations shown in Figs. 4C and 4D, 5C and 5D, and 6C and 6D are intended for supporting loads of a larger magnitude. A study of the embodiment shown in Fig. 4 indicates that it is best for three plane isolation inasmuch as its outer loop causes the isolator to rotate easily and absorb energy while a longitudinal load (load along the Y axis, see Figs. 2E and 2F) is being applied.

Although the invention has been described as in connection with certain specific embodiments, it should be readily apparent to those skilled in the art that various changes in the form and arrangements in part can be made to suit requirements without departing from the spirit and scope thereof.

We claim as our invention:

1. Apparatus for damping transmission of vibration and shock between two bodies and comprising an elongated sheet of metal or the like yieldable under loads, means connecting the long transverse ends of said sheet to said bodies whereby it assumes the shape of a quadrant of a circle, and elastic material in sheet form secured to the entirety of at least one surface of said sheet of metal.

2. Apparatus for damping transmission of vibration and shock between two bodies and comprising an elongated sheet of corrugated metal or the like having its long transverse ends connected to said bodies, and elastic material in sheet form bonded contiguously to at least one surface of said sheet of corrugated metal.

3. Apparatus for damping transmission of vibration and shock from one body to another and comprising a rectangular sheet of flexible metal having corrugations extending along the long transverse dimension of said sheet, elastic material in sheet form bonded contiguously to at least one surface of said sheet of metal, means connecting one end of said sheet of metal along its long transverse dimension to one of said bodies, and means connecting the other end of said sheet along its long transverse dimension to the other of said bodies.

4. Apparatus for damping transmission of vibration and shock from one body to another and comprising an elongated sheet of flexible metal or the like having its opposite long transverse ends connected to said bodies respectively, said sheet being bent between said opposite ends to form a curved surface, and elastic material in sheet form bonded contiguously to at least one of the curved surfaces of said flexible sheet.

5. Apparatus for damping transmission of vibration and shock between two bodies and comprising an elongated sheet of flexible material having its opposite long transverse ends connected to said bodies respectively, said material being bent between said opposite ends to form a curved surface, and elastic material in sheet form secured to the entirety of at least one of the curved surfaces of said flexible material.

6. Apparatus for damping transmission of vibration and shock between two bodies and comprising an elongated sheet of flexible material having its opposite long transverse ends connected to said bodies respectively, and elastic material in sheet form secured to the entirety of at least one of the surfaces of said flexible sheet.

7. A laminated vibration and shock isolating mounting member adapted to be secured to a supported object and a supporting object as a flexible connector extending therebetween, said member comprising contiguously bonded layers of flexible metal and resilient material, respectively.

References Cited in the file of this patent

UNITED STATES PATENTS

| | | |
|---|---|---|
| 1,735,899 | Henry | Nov. 19, 1929 |
| 2,211,295 | Searles | Aug. 13, 1940 |
| 2,224,648 | Haadem | Dec. 10, 1940 |
| 2,606,447 | Boltinghouse | Aug. 12, 1952 |
| 2,689,464 | Wurtz | Sept. 21, 1954 |
| 2,693,925 | Mirly | Nov. 9, 1954 |
| 2,723,538 | Heidorn | Nov. 15, 1955 |

FOREIGN PATENTS

| | | |
|---|---|---|
| 578,668 | Great Britain | July 8, 1946 |